United States Patent [19]

Asakura

[11] Patent Number: 4,878,976

[45] Date of Patent: Nov. 7, 1989

[54] METHOD FOR CONTINUOUSLY MANUFACTURING SYNTHETIC RESIN TUBE

[75] Inventor: Hiroshi Asakura, Kamakura, Japan

[73] Assignee: Toyo Chemical Co., Ltd., Kamakura, Japan

[21] Appl. No.: 283,967

[22] Filed: Dec. 13, 1988

[30] Foreign Application Priority Data

Dec. 17, 1987 [JP] Japan .............................. 62-319927
Jan. 18, 1988 [JP] Japan .................................. 63-7675

[51] Int. Cl.⁴ .......................................... B31C 13/00
[52] U.S. Cl. .................................. 156/190; 156/192; 156/195; 156/309.6; 156/322; 428/36.91
[58] Field of Search .............................. 156/189–195, 156/143–144, 184–188, 425, 430–432, 309.6, 322; 220/424, 450, 453, 461; 229/3.5 MF, 4.5; 428/35.9, 36.91

[56] References Cited

U.S. PATENT DOCUMENTS

| | | | |
|---|---|---|---|
| 1,985,997 | 1/1935 | Keeran .................................. | 156/187 |
| 2,748,805 | 6/1956 | Winstead .......................... | 156/195 X |
| 3,294,609 | 12/1966 | Foll ...................................... | 156/190 |
| 3,400,029 | 9/1968 | Mesrobian et al. .............. | 156/190 X |
| 3,524,779 | 8/1970 | Masters et al. ...................... | 156/190 |
| 3,623,929 | 11/1971 | Wannamaker et al. ............. | 156/190 |
| 4,078,957 | 3/1978 | Bradt ................................ | 156/187 X |
| 4,286,745 | 9/1981 | Fukmoka .............................. | 229/4.5 |
| 4,368,088 | 1/1983 | Asakura et al. ...................... | 156/143 |

*Primary Examiner*—David A. Simmons
*Attorney, Agent, or Firm*—Charles E. Baxley

[57] ABSTRACT

A method is provided for continuously manufacturing a synthetic resin tube. A plurality of pre-molded flat strips of synthetic resin material is passed through a heating zone to soften the strips. Then, the strips thus softened composed of a first strip for forming an outermost tube wall, a second strip for forming an innermost tube wall and at least one intermediate strip for forming an intermediate tube wall sandwiched between the first and second strips are fed to a mandrel comprising a plurality of rotating rollers arranged in a circular array and rotatably journalled in an end plate. The strips fed to the mandrel are wrapped around and advanced axially along the length of the mandrel with portions of adjacent turns of the intermediate strip not overlapping each other. The strips thus wrapped around the mandrel is then pressed by a pressure roller so as to be joined and welded to form a tube.

10 Claims, 2 Drawing Sheets

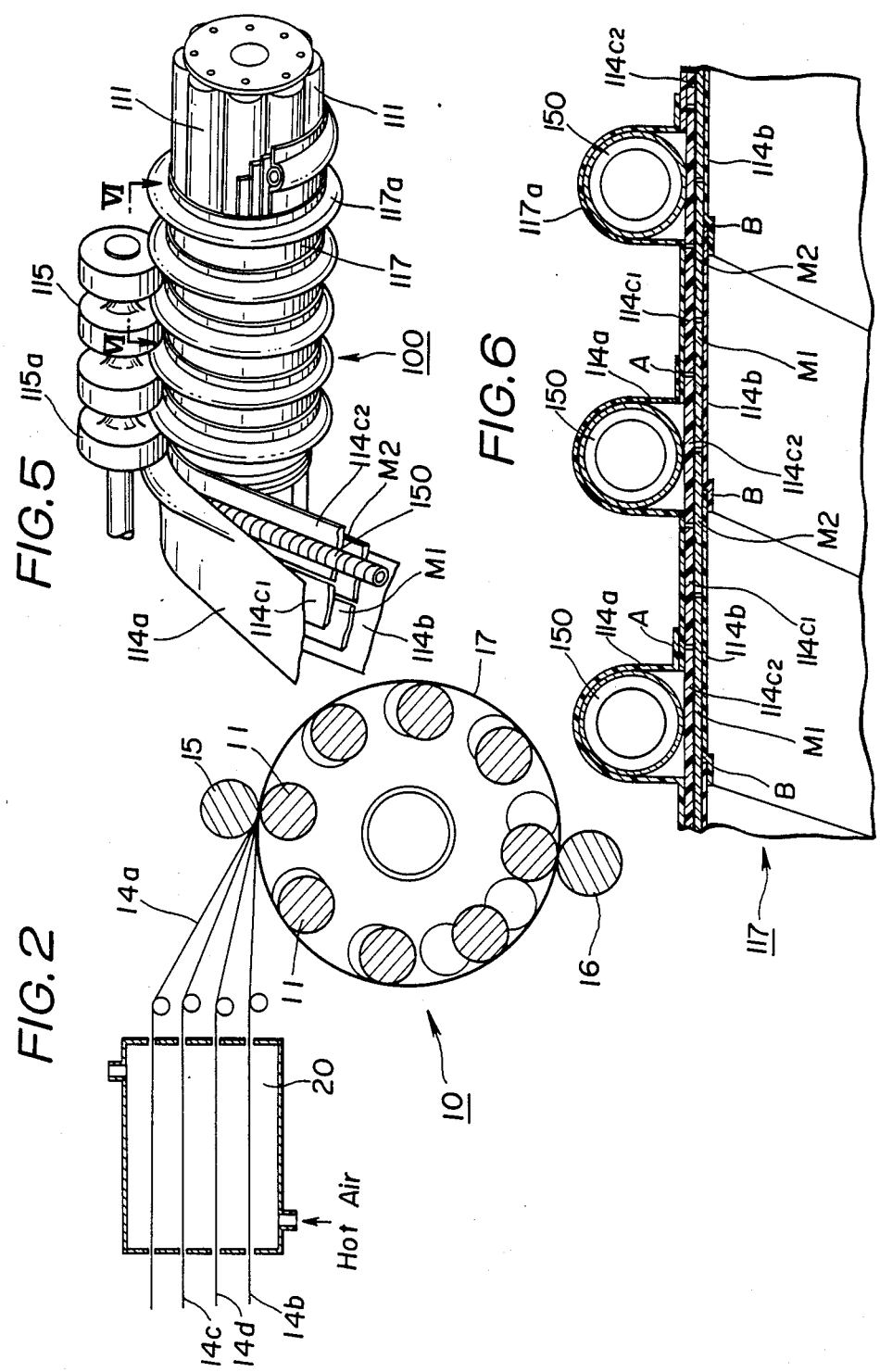

METHOD FOR CONTINUOUSLY MANUFACTURING SYNTHETIC RESIN TUBE

BACKGROUND OF THE INVENTION

This invention relates to a method for continuously manufacturing a synthetic resin tube and more particularly to a method for continuously manufacturing a synthetic resin tube from pre-molded flat strips of synthetic resin material in situ at a working site.

One of the commonly known methods for producing a synthetic resin tube comprises passing a synthetic resin material through a circular slit die of an extruder to thereby form tubular shape directly. In cases where a synthetic resin tube having a large diameter is produced, a large sized extruder is required. Moreover, when tubes having different diameters are produced, dies having corresponding diameters are required, resulting in high manufacturing costs.

Another method for producing a synthetic resin tube comprises forming a corrugated tube from a strip of synthetic resin in a softened state by the use of a plurality of rotating rollers arranged in a circular array such that the rollers define an imaginary cylinder about its central axis with the axes of the rollers being parallel to each other but angled relative to the central axis of the imaginary cylinder whereby as the rollers rotate the strip is helically wrapped around and advanced axially along the imaginary cylinder with portions of adjacent turns of the strip overlapping and joined together to form a continuous tube. In this method, however, only a single strip of synthetic resin material is wrapped around the imaginary cylinder with portions of adjacent turns of the strip overlapping one on another so that when the strip having a small thickness is employed, the width of the strip must be large in order to have wide overlapping portions, thus maintaining a certain tube wall thickness. This leads to considerable loss of manufacturing efficiency. On the contrary, when the strip having a large thickness is employed, it is quite difficult to have the tube all thickness uniform, while at the same time overlapping portious of the strip are raised to form stepped portions.

Alternatively, known synthetic resin tubes are produced in factories and transported by trucks and the like, which frequently necessitates high costs for transportation.

SUMMARY OF THE INVENTION

A principal object of the present invention is to provide a method for manufacturing a synthetic resin tube having a generally smooth outer and inner wall surfaces and having a uniform tube wall thickness.

Another object of the present invention is to provide a method for continuously and effectively manufacturing a synthetic resin tube from pre-molded flat strips of synthetic resin material in situ at a working site.

A still another object of the present invention is to provide a method for continuously manufacturing a synthetic resin tube having a large diameter and high sealability.

The above and other objects of the present invention will become apparent from the following description.

According to the present invention, there is provided a method for continuously manufacturing a synthetic resin tube comprising the steps of:

arranging a circular array or plurality of rollers each rotating at the same speed such that an imaginary cylinder is defined about its central axis by the rollers, the longitudinal axes of the rollers being parallel to each other but offset with respect to the central axis;

continuously passing a plurality of pre-molded flat strips of synthetic resin material through a heating zone to thereby heat the pre-molded flat strips to a temperature of not lower than a softening point of the synthetic resin material and not higher than a melting point of the synthetic resin material, the plurality of the pre-molded flat strips comprising a first strip for forming an outermost wall of the tube, a second strip for forming an innermost wall of the tube and at least one intermediate strip for forming an intermediate tube wall sandwiched between the first and second strips;

continuously feeding the flat strips thus heated and softened generally perpendicularly to lengths of the rollers in such a manner that each of the strips is helically wrapped around and advanced axially along the imaginary cylinder with each of the strips displaced along the lengths of the rollers and with portions of adjacent turns of the at least one intermediate strip forming the intermediate tube wall not overlapping one on another; and pressing at least one pressure roller against the plurality of the flat strips to join and weld the strips together, whereby to form the synthetic resin tube having generally smooth outer and inner wall surfaces.

BRIEF DESCRIPTION OF THE DRAWINGS

FIG. 2. is a diagrammatical cross-sectional view taken along lines II—II of FIG. 1, with a heating zone being additionally illustrated;

FIG. 5 is a perspective view illustrating a synthetic resin corrugated tube being produced according to the method of the present invention.

FIG. 6 is a fragmentary cross-sectional view showing the tube wall structure and taken along lines VI—VI of FIG. 5.

PREFERRED EMBODIMENTS OF THE INVENTION

Figure 1:
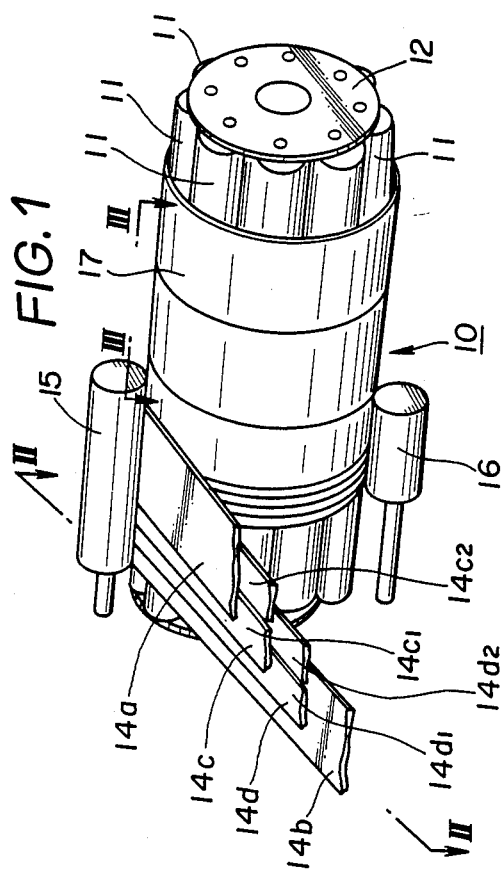
FIG. 1 is a perspective view illustrating a synthetic resin tube being produced according to the method of the present invention.

Referring to FIG. 1, a mandrel used for practicing the method according to the present invention is generally indicated by 10. This type of mandrel is described in U.S. Pat. No. 3,532,580 which is incorporated herein by reference. The mandrel 10 comprises a plurality of rotating rollers 11 arranged in a circular array and rotatably journalled in an end plate 12, the rollers together defining an imaginary cylinder. The longitudinal axes of the rollers 11 are aligned in parallel to each other but offset with respect to the central axis of the imaginary cylinder, so that a plurality of pre-molded flat strips 14a and 14d of synthetic resin material are fed onto the mandrel 10 and are helically wrapped around and advanced axially along the length of the mandren 10 as each of the rollers is rotated.

As shown in FIG. 2, before the pre-molded flat strips 14a, 14b, 14c, 14d are fed onto the mandrel 10, they are continuously passed through a heating zone 20 where hot air is passed from a heating source (not shown). The pre-molded flat strips 14a to 14d are thus heated to a temperature of not lower than a softening point of the synthetic resin material and not higher than a melting point of the synthetic resin material. Then, the strips 14a to 14d thus heated and softened are continuously fed generally perpendicularly to the length of the mandrel 10 so that each of the strips 14a to 14d is helically wrapped around and advanced axially along the length of the mandrel 10 with each of the strips 14a to 14d displaced along the length of the mandrel 10. Subsequently, the strips 14a to 14d are pressed by pressure rollers 15, 16 and are joined and welded together to form a synthetic resin tube 17 (see FIG. 1).

Figure 3:
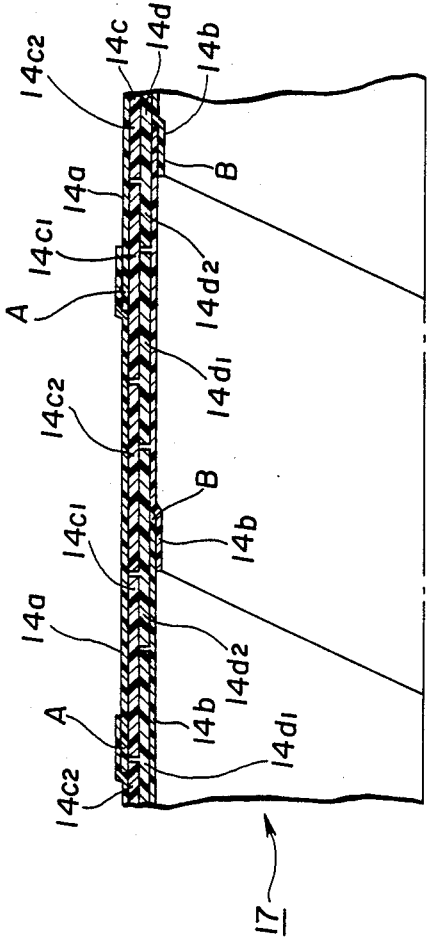
FIG. 3 is a fragmentary cross-sectional view showing the tube wall structure and taken along lines III—III of FIG. 1.

Referring to FIG. 3, the flat strip 14a forms an outermost wall of the tube 17, while the flat strip 14b forms an innermost wall of the tube 17. The flat strips 14c, 14d are sandwiched between the strips 14a and 14b and form an intermediate tube wall. In this embodiment, the flat strip 14c is composed of two strips 14c1, 14c2 which have been fed to the mandrel 10 side by side as shown in FIG. 1 without portions of adjacent turns of the strips 14c1, 14c2 overlapping with each other when being wrapped around the mandrel 10. Similarly, the flat strips 14d is composed of two strips 14d1, 14d2 which have been fed to the mandrel 10 side by side without portions of adjacent turns of the strips 14d1, 14d2 overlapping with each other. Although the flat strips 14a forming the outermost tube wall and the flat strips 14b forming the innermost tube wall may be wrapped around the mandrel 10 without portions of adjacent turns overlapping one on another, it is preferred that each of the portions of adjacent turns of the strips 14a, 14b overlap each other as shown at A and B (see FIG. 3) in order to secure tight sealability of the tube 17.

As shown in FIG. 3, each of the strips 14a, 14b preferably has a thickness smaller than that of each of the intermediate strips 14c1, 14c2, 14d1, 14d2 and has a width larger than that of each of the intermediate strips. With such structure, overlapping or stepped portions A, B of the strips 14a, 14b each forming an outer wall surface and an inner wall surface can be made generally smooth and the intermediate strips 14c1, 14c2, 14d1, 14d2 are sealingly covered by the strips 14a, 14b. Since the intermediate strips 14c, 14d do not overlap each other, there are no stepped portions formed while at the same time predetermined wall thickness is secured to maintain the required strength.

Figure 4:
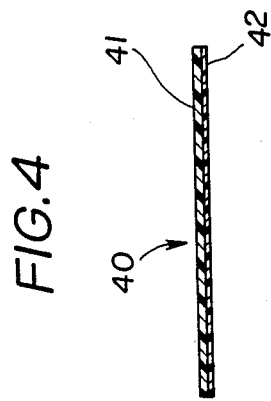
FIG. 4 is a diagrammatical cross-sectional view of an example of an intermediate strip.

In practical application, each of the outer strip 14a and the inner strip 14b may preferably be made of low density polyethylene and may have a thickness of about 0.5 mm. As shown in FIG. 4, each of the intermediate strips 14c1, 14c2, 14d1, 14d2 may preferably be a laminated composite sheet 40 composed of a low density polyethylene layer 41 and a high density polyethylene layer 42. Since the low density polyethylene layer 41 has a lower softening point, the layer 41 is easily welded together. On the other hand, the high density polyethylene layer 42 increases the strength of the composite sheet 40. The intermediate strip may have a thickness of about 1 mm and a width of a half or smaller than that of the strips 14a, 14b. The strips 14a to 14d may be wound to form rolls for storage and, upon production of the tubes, they may be paid out from the rolls.

Figure 7:
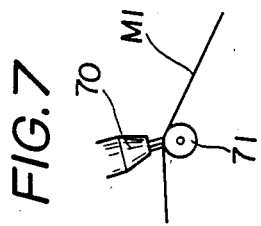
FIG. 7 is a diagrammatical view showing a metal sheet strip to which an adhesive is applied.

In FIGS. 5 to 7, another embodiment of the present invention is illustrated. In this embodiment, the same or similar members or parts to those shown in FIGS. 1 to 4 are indicated by the same reference numerals with 100 added thereto and the duplicate description is omitted for simplicity.

Referring to FIG. 5, a corrugated tube 117 having spiral convolutions 117a is formed. A flexible core member 150 made of synthetic resin or rubber is continuously passed between an outer strip 114a and an intermediate strip 114c2 so as to be embedded therebetween to form spiral convolutions 117a. In order to further reinforce the corrugated tube 117, two metal sheet strips M1, M2 made of aluminum, steel or stainless steel arranged side by side are continuously fed between the intermediate strips 114c1, 114c2 and an inner strip 114b. Before the metal sheet strips M1, M2 are fed between the strips 114c1, 114c2, 114b, an adhesive of any known type is applied to the strips M1, M2 from a coating machine 70 as shown in FIG. 7 and the strips M1, M2 are guided through a roll 71 onto a mandrel 100. The outer strip 114a and the inner strip 114b as well as the flexible core member 150, the intermediate strips 114c1, 114c2 and the metal sheet strips M1, M2 are then pressed by a pressure roler 115 having a plurality of ridges 115a along the length thereof. The ridges 115a are designed in consideration of the hight, width and pitch of the convolutions 117a. As shown in FIG. 6, the reinforced corrugated tube 117 having the core member 150 and the metal sheet strips M1, M2 embeded therein are produced. As the metal sheet strips M1, M2 are sealingly embedded in the tube wall, they are hardly susceptible to corrosion. Although not shown in the first embodiment in FIGS. 1 to 4, metal sheet strips M1, M2 may be fed between the strips 14a, 14b for reinforcing the tube 17.

Although the present invention has been described with reference to the preferred embodiments, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A method for continuously manufacturing a synthetic resin tube comprising the steps of:
    arranging in a circular array a plurality of rollers each rotating at the same speed such that an imaginary cylinder is defined about its central axis by said rollers, the longitudinal axes of said rollers being parallel to each other but offset with respect to said central axis;
    continuously passing a plurality of pre-molded flat strips of synthetic resin material through a heating zone to thereby heat the pre-molded flat strips to a temperature of not lower than a softening point of said synthetic resin material and not higher than a melting point of said synthetic resin material, the plurality of said pre-molded flat strips compring a first strip for forming an outermost wall of the tube, a second strip for forming an innermost wall of the tube and at least one intermediate strip for forming an intermediate tube wall sandwiched between said first and second strips;
    continuously feeding said flat strips thus heated and softened generally perpendicularly to lengths of said rollers in such a manner that each of said strips is helically wrapped around and advanced axially along said imaginary cylinder with each of the strips displaced along the lengths of said rollers and with portions of adjacent turns of said at least one intermediate strip forming the intermediate tube wall not overlapping one on another; and pressing at least one pressure roller against the plurality of said flat strips to join and weld the strips together, whereby to form the synthetic resin tube having generally smooth outer and inner wall surfaces.

2. The method according to claim 1 wherein each of said first and second strips is helically wrapped around said imaginary cylinder with portions of adjacent turns of each of said first and second strips overlapping one on another.

3. The method according to claim 1 wherein while the plurality of said flat strips are continuously fed generally perpendicularly to the lengths of said rollers, a flexible core member is continuously fed between said first and second strips to form spiral convolutions around the tube.

4. The method according to claim 2 wherein while the plurality of said flat strips are continuously fed generally perpendicularly to the lengths of said rollers, a flexible core member is continuously fed between said first and second strips to form spiral convolutions around the tube.

5. The method according to claim 1 wherein each of said first and second strips has a thickness smaller than that of said intermediate strip and has a width larger than that of said intermediate strip.

6. The method according to claim 1 wherein said intermediate strip is a laminated composite sheet having a surface layer made of thermoplastic resin having a low softening point.

7. The method according to claim 6 wherein said laminated composite sheet is composed of low density polyethylene and high density polyethylene layers.

8. The method according to claim 1 wherein while the plurality of said flat strips are continuously fed generally perpendicularly to the lengths of said rollers, a metal sheet strip is continuously fed between said first and second strips to reinforce the tube.

9. The method according to claim 8 wherein an adhesive is applied to said metal sheet strip before being fed between said first and second strips.

10. The method according to claim 8 wherein said metal sheet strip is made of a material selected from the group consisting of aluminum, steel and stainless steel.

* * * * *